United States Patent
Higashiyama et al.

(10) Patent No.: US 7,425,592 B2
(45) Date of Patent: Sep. 16, 2008

(54) WATER-BASED INK FOR INK JETTING AND INK JET RECORDING METHOD

(75) Inventors: Shunichi Higashiyama, Yokkaichi (JP); Masaya Fujioka, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 134 days.

(21) Appl. No.: 11/319,170

(22) Filed: Dec. 28, 2005

(65) Prior Publication Data

US 2006/0142469 A1 Jun. 29, 2006

Related U.S. Application Data

(63) Continuation of application No. 10/154,840, filed on May 28, 2002, now abandoned, which is a continuation-in-part of application No. 09/392,729, filed on Sep. 9, 1999, now abandoned.

(30) Foreign Application Priority Data

Sep. 22, 1998 (JP) .................. 10-268200

(51) Int. Cl.
*C08L 39/06* (2006.01)
*C09D 11/10* (2006.01)

(52) U.S. Cl. ............ 524/548; 524/542; 524/800; 524/812; 106/31.13; 106/31.27; 106/31.57; 347/100

(58) Field of Classification Search ......... 524/542, 524/548, 800, 812; 106/31.13, 31.27, 31.57; 347/100

See application file for complete search history.

(56) References Cited

U.S. PATENT DOCUMENTS

| | | | |
|---|---|---|---|
| 5,156,675 A | 10/1992 | Breton | |
| 5,328,504 A | 7/1994 | Ohnishi | |
| 5,441,561 A * | 8/1995 | Chujo et al. ............. | 106/31.28 |
| 5,606,356 A | 2/1997 | Noguchi | |
| 5,674,314 A | 10/1997 | Auslander et al. | |
| 5,700,317 A | 12/1997 | Adamic | |
| 5,725,643 A | 3/1998 | Higashiyama | |
| 5,746,815 A | 5/1998 | Caputo | |
| 5,750,742 A | 5/1998 | Schroder et al. | |
| 5,769,930 A * | 6/1998 | Sano et al. ............. | 106/31.36 |
| 5,854,307 A | 12/1998 | Kimura et al. | |
| 5,885,338 A | 3/1999 | Nigam et al. | |
| 5,942,560 A | 8/1999 | Idogawa et al. | |

FOREIGN PATENT DOCUMENTS

| | | |
|---|---|---|
| JP | 56-118470 | 9/1981 |
| JP | 9-291247 | 11/1997 |
| JP | A-10-77430 | 3/1998 |

* cited by examiner

*Primary Examiner*—Helen L. Pezzuto
(74) *Attorney, Agent, or Firm*—Oliff & Berridge, PLC

(57) ABSTRACT

A water-based ink for ink jetting and ink jet recording method, in which stable jetting, clearness of the recorded matter, high density recording, water resistance, and friction resistance are well-balanced, and being useful for ink for various types of ink jet recording. After 5% of the water soluble colored resin comprising 5,5'-dimethylhydantoin-formaldehyde resin and color index number basic red 1:1 and 10% of polyethyleneglycol (average molecular weight 200) and 6% of triethyleneglycolmonometylether and 79% of pure water are fully stirred to be mixed, the mixture is filtered with a membrane filter of 0.8 μm thickness to become ink. Experimental evaluation using the recording head regarding jetting stability, jetting response, quality of the recorded images, friction resistance against various recording materials, and water resistance against various recording materials is made, and good results are obtained.

15 Claims, No Drawings

WATER-BASED INK FOR INK JETTING AND INK JET RECORDING METHOD

CROSS REFERENCE TO RELATED APPLICATIONS

The present application is a Continuation of U.S. patent application Ser. No. 10/154,840, filed May 28, 2002, abandoned which in turn is a Continuation-in-Part of Ser. No. 09/392,729, filed Sep. 9, 1999, abandoned the entire disclosures of which are incorporated herein by reference.

BACKGROUND OF THE INVENTION

1. Field of Invention

The present invention is related to a water-based ink for ink jetting comprising water, a water soluble organic solvent and a coloring agent as essential components. The present invention is also related to an ink jet recording method for recording by flying minute droplets of the ink.

2. Description of Related Art

In the ink jet recording method, ink droplets are formed by various ink jetting methods including the electrostatic suction method, a method of applying mechanical vibration or displacement using a piezoelectric element, or a method of generating bubbles by heating ink and utilizing pressure generated thereby, and recording is operated by adhering a part of or all of the formed droplets to a recording material such as paper. A lot of development of the water-based ink using water as a main solvent has been made for ink for the ink jet recording method.

The water-based ink for ink jetting needs to meet some conditions of no clogging at the head end portion of the recording apparatus or the ink passage, stable jetting, providing recording images of clear tone of color and sufficient high density and good water resistance and good friction resistance of the recorded matter.

Dye or pigment is generally used for a coloring agent of the water-based ink for ink jetting.

Pigment is better than dye in terms of water resistance; however, pigment is worse in terms of the liquid stability and the dispersion of the pigment becomes unstable by the long period preservation or the water evaporation because pigment is not dissolved but is dispersed in the ink medium. Therefore, compared to the dye ink, the pigment ink is easy to cause clogging at the end portion of the head of the ink jet printer or in the ink passage. Because the pigment exists as a particle on the recorded matter, it has a problem in terms of the friction resistance. Therefore, it is a rare case that the pigment ink for the ink jet printer has become a commercial product, and most of the pigment ink is in the development stage.

Although the water soluble dye is worse in terms of the water resistance compared to the pigment, the dye ink is hardly clogged at the end portion of the head of the ink jet printer or the ink passage and it is possible to acquire relatively easily a recorded matter of clear color tone and high density because the water soluble dye is completely dissolved in the ink medium. Therefore, there are many cases that the water-based ink for ink jet printer using water soluble dye as a coloring agent has become a commercial product.

However, there has been no example of water-based ink for ink jetting that meets all conditions of sufficient jetting stability of ink jet recording, and clearness, high density recording, water resistance and friction resistance of the recorded matter.

SUMMARY OF THE INVENTION

The present invention is to solve the above-described problems, and it is an object of the invention to provide a water-based ink for ink jetting and ink jet recording method that meets all conditions of sufficient jetting stability of ink jet recording, and clearness, high density recording, water resistance and friction resistance of the recorded matter.

In order to achieve the above-described object, water-based ink for ink jetting of the present invention includes water soluble colored resin wherein water soluble resin as a main component of the coloring agent is uniformly coloring processed by a basic dye.

According to the water-based ink for ink jetting of an embodiment of the present invention, the water soluble resin component of the water soluble colored resin can be selected from 5,5'-dimethylhydantoinformaldehyde resin obtained by copolymerization of 5,5'-dimethylhydantoin and formaldehyde, or 1-methylol-5,5'-dimethylhydantoin resin obtained by condensation polymerization of 1-methylol-5,5'-dimethylhydantoin, or polyvinylpyrrolidone obtained by addition polymerization of vinylpyrolidone.

According to the water-based ink for ink jetting of an embodiment of the present invention, molecular weight of the water soluble resin of the water soluble colored resin can be equal to or less than 10000.

According to the water-based ink for ink jetting of an embodiment of the present invention, a compounding ratio of the water soluble resin and the basic dye in the water soluble colored resin can be within a range of 10:1 to 1:1.

According to the water-based ink for ink jetting of an embodiment of the present invention, a content amount of the water soluble colored resin in the ink can be from 1 to 10 weight %.

According to the ink jet recording method of an embodiment of the present invention, a recording operation can be made by using the water-based ink for ink jetting of the present invention.

As apparent from the above explanation, the water-based ink for ink jetting of the invention includes water soluble colored resin wherein the water soluble resin as a main component of the coloring agent is uniformly coloring processed by the basic dye. Preferably, the water soluble resin component of the water soluble colored resin is selected from 5,5'-dimethylhydantoinformaldehyde resin obtained by copolymerization of 5,5'-dimethylhydantoin and formaldehyde, or 1-methylol-5,5'-dimethylhydantoin resin obtained by condensation polymerization of 1-methylol-5,5'-dimethylhydantoin, or polyvinylpyrrolidone obtained by addition polymerization of vinylpyrolidone. More preferably, molecular weight of the water soluble resin of the water soluble colored resin is equal to or less than 10000. More preferably, the compounding ratio of the water soluble resin and the basic dye in the water soluble colored resin is within a range of 10:1 to 1:1. More preferably, the content amount of the water soluble colored resin in ink is from 1 to 10 weight %. Therefore, the stable jetting, clearness of the recorded matter, high density recording, water resistance, and friction resistance are well-balanced and excellent in ink jet recording. The ink of the invention is useful for ink for various types of ink jet recording and the ink jet recording method used with the ink can provide excellent recording.

The ink jet recording method of the invention is characterized in recording using the above-described water-based ink for ink jetting. Therefore, the stable jetting, clearness of the recorded matter, high density recording, water resistance, friction resistance are well-balanced and excellent in ink jet recording. The ink of the invention is useful for ink for various types of ink jet recording and the ink jet recording method used with the ink can provide excellent recording.

DETAILED DESCRIPTION OF PREFERRED EMBODIMENTS

The preferred embodiments of the invention will be explained.

Water soluble colored resin that is a main component of a coloring agent of the invention is water soluble resin that is uniformly colored by basic dye. By using the water soluble colored resin as a coloring agent for the water-based ink for ink jetting, great excellent water resistance can be obtained as compared to the water-based ink using dye as a coloring agent. Because the water soluble colored resin is completely dissolved in the ink as same as the case that dye is used as a coloring agent, recording excellent in clearness, high density recording and friction resistance can be obtained without obstructing the stable jetting.

As used herein, the phrase "uniformly coloring processed by a basic dye" or similar phrases generally refers to a product obtained by treating a water soluble resin with a basic dye, under specified conditions, whereby the basic dye and water soluble resin are bonded at a fixed ratio. The product, which can be described as a coloring agent, is in a form of micro-suspension bodies (or, when suspended in an appropriate liquid medium such as water, colloidal particles) that include both resin and dye molecules. Such a product is very different from a product that results from the simple mixing of resin material and dye, as is conventionally used. Rather, the uniform color processing results in a combination state maintained as a micro association body, where there exists a weak combination of the water soluble resin and the basic dye, but where the basic dye is not chemically bonded to the water soluble resin. In this form, the water soluble resin wraps or envelops the basic dye molecules to form weak bonds, such as by charge attraction force, intramolecular force, and bonds between cubic molecules.

As described below, such micro association bodies are generally formed by mixing the water soluble resin and basic dye under conditions where there is a high probability that the materials contact each other, and where the molecules can move freely. For example, this mixing can be provided by the present invention by heating the materials to a suitable temperature of, for example, a temperature of equal to or greater than 60° C. This process is believed to provide the improved water resistance, because the association between the resin molecules and dye molecules is maintained even after mixing and printing is conducted.

The reason that the excellent water resistance can be obtained by using the water soluble colored resin is as follows.

In the coloring process of the water soluble colored resin of the invention, a weak combination of the water soluble resin and basic dye is formed, and the combination is maintained as a minute association body after the water soluble colored resin is dissolved and mixed in the ink. Namely, the basic dye on the recorded matter is maintained by the combination with the water soluble resin and, therefore, even if water is supplied after the recorded matter is dried, the basic dye is not easily washed out by water by reason that the dispersion speed of the water soluble resin into the water is slow.

Thus, by using water soluble colored resin, the water-based ink for ink jetting and the ink jet recording method being excellent in stable jetting, clearness, high density recording, water resistance and friction resistance can be achieved.

The water soluble colored resin having solubility to water of 5% or more than 5% and slow dissolution speed and a characteristic that its aqueous solution does not cause remarkable viscosity is preferably used for the invention. In particular, 5,5'-dimethylhydantoinformaldehyde resin obtained by copolymerization of 5,5'-dimethylhydantoin and formaldehyde, or 1-methylol-5,5'-dimethylhydantoin resin obtained by condensation polymerization of 1-methylol-5,5'-dimethylhydantoin, or polyvinylpyrrolidone obtained by addition polymerization, or derivatives thereof can be used for the water soluble colored resin of the invention. However, the water soluble colored resin is not limited to the above-described ones so long as the effect of the invention can be obtained. Moreover, more than two kinds of resins can be mixed to be used. The molecular weight of the water soluble resin is preferable equal to or less than 10000. As used herein, "mean (average) molecular weight" or "molecular weight" means weight average molecular weight.

Various ones on the market can be used for the basic dye of the invention. In particular, color index number basic red 1, 1:1, 2, 12, 13, 14, 18, 22, 27, 28, 29, 34, 38, 39, 46, 46:1, 67, 69, 70, color index number basic violet 1, 2, 3, 4, 5, 7, 8, 10, 11, 11:1, 20, 33, color index number basic blue 3, 6, 7, 9, 11, 12, 16, 17, 24, 26, 41, 47, 66, color index number basic green 1, 4, 5, color index number basic yellow 1, 11, 19, 21,24, 25, 28, 29, 36, 45,51, 67, 73, color index number basic orange 14, 21, 22, 32, color index number basic brown 1, 4 can be used for the basic dye of the invention, however, the basic dye is not limited to the above-described ones. Moreover, more than two kinds of basic dyes can be mixed to be used, and in this case, a desired color that cannot be obtained by only one kind can be obtained.

Because the basic dye that is in the condition on the market may include a great amount of inorganic impurities such as sodium sulfate, a purifying process by ion exchange resin or filtration can be provided if necessary. When the basic dye includes a great amount of inorganic impurities, the combination in the coloring process may be obstructed or sufficient coloring may not be obtained or the inorganic impurities may be deposited at the head end portion and cause clogging. From the above-described points, the purity of the basic dye is preferably equal to or more than 90% and more preferably equal to or more than 95%.

The compounding ratio of the water soluble resin and the basic dye in the water soluble colored resin is preferably in the range from 10:1 to 1:1. If the compounding ratio of the basic dye is less than the above-mentioned ratio, sufficient coloring may not be obtained, and if the compounding ratio is more than the above-mentioned ratio, the effect of the combination of the water soluble resin and the basic dye may not be fully obtained.

The water soluble colored resin of the invention can be processed, for example, by any one of the methods described below.

1) Heating the water soluble resin to a temperature of equal to or more than 60° C. to make liquid of low viscosity, and adding the basic dye to the liquid, and after mixing and stirring them to become an uniform condition, cooling it to the ordinary (i.e., room) temperature to obtain the water soluble colored resin.

2) Heating the nonvolatile organic solvent that is an ink component to a temperature of equal to or more than 60° C., and after adding the water soluble resin and basic dye to the heated solvent and mixing and stirring to become a uniform condition, cooling it to the ordinary temperature to obtain the nonvolatile organic solvent solution of the water soluble colored resin.

The preferable content by amount of the water soluble colored resin obtained by the above-described method as a coloring agent in water-based ink for ink jetting is 1-10 weight % relative to the total amount of ink, more preferably 2-6 weight %. If the content by amount of the water soluble colored resin is less than 1 weight %, sufficient coloring may not be obtained and the clear and high density recording may not be obtained. If the content by amount of the water soluble colored resin is more than 10 weight %, the ink may be more viscous than is desirable, the stable jetting may be obstructed and drying of the ink on the recording paper may become extremely slow.

The solvent used in the invention can be a mixed solvent of water and a water soluble organic solvent.

For water, general water containing various ions is not preferable, but instead deionized water is preferable. The content by amount of water is decided in a broad range according to the characteristic of the desired ink, and generally the content by amount of water is 10-90 weight % relative to the total amount of ink, preferably 40-80 weight %.

The water soluble organic solvent is used mainly for the purpose of preventing drying of ink at the top end of the ink jet head, therefore, a solvent of low volatility is preferably used. Such water soluble organic solvents include polyalkyleneglycol such as polyethyleneglycol; alkyleneglycol such as ethyleneglycol, propyleneglycol, butyleneglycol, diethyleneglycol, depropyleneglycol, triethyleneglycol, tripropyleneglycol, 1,2,6-hexanetriol, thiodiglycol, 1,3-butanediol, 1,5-pentanediol, hexyleneglycol; and pyrolidone such as 2-pyrolidone, N-methyl-2-pyrolidone. Either one kind of the above-described water soluble organic solvents can be used, or more than two kinds of the above-described water soluble organic solvents can be mixed to be used.

The content amount of the above-described water soluble organic solvent in the ink can be 5-50 weight % relative to the total amount of ink, preferably 7-40 weight %, more preferably 10-30 weight %. If the content amount of the water soluble organic solvent is less than 5 weight %, the wetting operation may become insufficient and clogging may be caused. If the content amount of the water soluble organic solvent is more than 50 weight %, ink may be more viscous than is desirable, and jetting may become impossible and drying of the ink on the recording paper may become extremely slow.

The basic composition of the ink of the invention and used for the invention is described above, and the various known agents such as penetrating agent, dispersing agent, surface active agent, viscosity adjusting agent, surface tension adjusting agent, pH adjusting agent, antiseptics and mildewproof agent can be added if necessary.

As the penetrating agent, polyhydric alcohol monoalkylether that has 0.1 mmHg or less than 0.1 mmHg of steam pressure at 20° C. is preferably used. Polyhydric alcohol monoalkylether that has characterisitics as follows is preferably used; by gathering effectively the penetrating speed of ink into the recording paper, improving the fast drying of ink on the paper, preventing bleeding (bleeding on the border of different colors) caused by the slow drying of ink on the paper, and being difficult to cause feathering (feathering of a mustache shape along the paper fiber).

Examples of polyhydric alcohol monoalkylether are diethyleneglycolmonomethylether (0.1 mmHg of steam pressure at 20° C.), diethyleneglycolmonobuthylether (0.01 mmHg of steam pressure at 20° C.), diethyleneglycolmonoisobuthylether (0.01 mmHg of steam pressure at 20° C.), dipropyleneglycolmonomethylether (0.06 mmHg of steam pressure at 20° C.), dipropyleneglycolmonopropylether (0.02 mmHg of steam pressure at 20° C.), dipropyleneglycolmonoisopropylether (0.05 mmHg of steam pressure at 20° C.), dipropyleneglycolmonobuthylether (0.05 mmHg of steam pressure at 20° C.), triethyleneglycolmonomethylether (less than 0.01 mmHg of steam pressure at 20° C.), triethyleneglycolmonobuthylether (less than 0.01 mmHg of steam pressure at 20° C.), tripropyleneglycolmonomethylether (0.02 mmHg of steam pressure at 20° C.), and tripropyleneglycolmonobuthylether (less than 0.01 mmhg of steam pressure at 20° C.).

General polyhydric alcohol monoalkylether has a peculiar smell and, if a polyhydric alcohol monoalkylether that has a steam pressure of more than 0.1 mmHg at 20° C. is used for ink, the ink itself may have a terrible smell and therefore it may cause a problem for use in the office or at home. However, the above-described polyhydric alcohol monoalkylether that has a low steam pressure of 0.1 mmHg or less than 0.1 mmHg at 20° C. has little smell if used for ink, and therefore the problem described above does not result.

Moreover, among the above-described polyhydric alcohol monoalkylether, those having less than 0.01 mmHg of steam pressure at 20° C. have especially little smell and therefore they are preferably used for ink. The content amount of the above-described polyhydric alcohol monoalkylether in the ink is preferably 3-15 weight % relative to the total amount of ink. If the content amount of the above-described polyhydric alcohol monoalkylether is less than 3 weight %, the penetrating speed of ink into the recording paper may be slow and problems may be caused for drying time and bleeding. If the content amount of the above-described polyhydric alcohol monoalkylether is more than 15 weight %, ink may penetrate into the recording paper terribly and ink may penetrate to the rear side of the recording paper and a problem of feathering may be caused.

Monatomic alcohol such as ethylalcohol, 1-propanol, and 2-propanol can be added if necessary for the purpose of controlling the degree of penetration and drying.

When ink for the ink jet recording method of charging recording liquid is compounded, a resistivity adjusting agent such as inorganic salt including lithium chloride, ammonium chloride, or sodium chloride can be added.

When the ink is used for the ink jet method of jetting ink by the operation of heat energy, the material value of heat (for example, specific heat, coefficient of thermal expansion, and coefficient of thermal conductivity) may be adjusted.

In the ink of the invention and the ink jet recording method used with the ink, the problems of the prior art are fully solved and the stable jetting, clearness of the recorded matter, high density recording, water resistance, and friction resistance are well-balanced and excellent ink jet recording is obtained. The ink of the invention is useful for ink for various types of ink jet recording and the ink jet recording method used with the ink can provide excellent recording.

Furthermore, the coloring agent of the present invention, being uniformly coloring processed by a basic dye, provides inks and printed images that exhibit improved color brightness and improved waterfastness. This is provided because the individual dye molecules are wrapped or enveloped by the water soluble resin separately, and maintained in a micro association form.

The colorant of the claimed invention where the water soluble resin is uniformly coloring processed by a basic dye is thus different from a mere mixture of a water soluble resin and basic dye. A mere mixture of the specified components according to conventional processing does not result in a resin that is uniformly coloring processed by a basic dye, as specified in the present invention. In particular, the uniform color processing results in a colorant that exhibits significantly improved water resistance and provides improved color brightness compared to such conventional inks formed by mere mixing of a water soluble resin and basic dye.

Although not limited to any particular theory, it is believed that the improved properties of the ink compositions of the present invention, including the improved color brightness and improved waterfastness, are achieved by the uniformly coloring process described herein. Such process results is a more intimate mixture and interrelation of the resin and dye molecules, providing an improved ink composition.

It is generally known in the art that a coloring efficiency of a dye is dependent upon the excited state electron configuration of the dye molecules when exposed to light, and how stably that excited state can be maintained. If a highly excited state can be provided and stably maintained, i.e., if the excited state can be obtained and undesired electron exchange with other molecules does not occur, then a high color brightness can be reliably provided. This high and stable excited electron state is provided by the processes of the present invention.

In particular, mixed colloidal particles of the present invention are formed by uniformly coloring processing a resin with a basic dye. In this form, the colloidal particles include both resin and dye molecules in an intimate relationship, rather than only resin molecules or only dye molecules. As a result of this intimate relationship, due molecules are resin molecules are mixed with each other such that dye molecules do not necessarily contact only other dye molecules. Because dye molecules do not make contact only with each other, electron exchange between dye molecules does not occur when the due molecules are in the excited state, and thus the excited state can be maintained independently of the adjacent dye molecules to provide a high coloring quality. In contrast, according to prior art ink compositions where dye molecules contact each other in dye colloidal particles, electron exchange is easily performed between the adjacent dye molecules. Therefore, the excited state of the dye molecules is unstable and coloring quality is inferior. The uniformly coloring process of the present invention thus provides an ink composition with improved coloring qualities.

Furthermore, the structure of the colloidal particles of the ink compositions of the present invention are different than are provided by conventional ink compositions. This difference results in significantly improved waterfastness of the ink on a printed substrate.

Basic dyes, in contrast to other types of dyes such as acid dyes or direct dyes, generally have a low water solubility. The low water solubility generally arises because the dye molecules have few oxygen atoms and/or because oxygen atoms that may be present in the molecule are situated such that it is difficult for water to interact with the oxygen atom to solubilize the molecule. Accordingly, when the basic dye is dissolved in water, the molecules tend to congregate and form colloidal particles (referred to as "dye colloidal particles"). Dispersion of a water soluble resins in water also generally results in a similar composition. That is, when a water soluble resin is dissolved in water, resin particles also tend to congregate and form colloidal particles (refer to as "resin colloidal particles"), generally because the resin particles are an organic substance.

However, in such conventional ink compositions, the water soluble resin does not combine with the dye colloidal particles when forming the mixture in water, and instead resin colloidal particles are formed as separate entities from the dye colloidal particles. Even if the water soluble resin is added to the solution of dye colloidal particles, the result is to form separate resin colloidal particles along with the dye colloidal particles, so that two separate kinds of colloidal particles exist in solution. This result is that the dye colloidal particles and resin colloidal particles are separately dispersed in the water. When printing is conducted using the conventional ink compositions, the result is that the resin colloidal particles of the ink are strongly fixed to the substrate (e.g., paper) because they are resins; however, the dye colloidal particles are generally poorly fixed to the substrate, since they are not intimately related to the resin colloidal particles. Accordingly, water resistance of the ink composition on the substrate is low, since water can more easily liberate the dye colloidal particles from the substrate, leaving behind the resin colloidal particles.

The present invention, however, overcomes the above problems by uniformly coloring processing a resin with a basic dye. In the inks of the present invention, the dye particles and resin particles are intimately mixed and associated with one another, rather than being separated in separate colloidal particles as described above for conventional inks. In the present invention, the dye molecules are intimately mixed and associated with the rein particles. That is, the water soluble resin is uniformly colorant processed by the basic dye. Once this composition is formed, the resin/dye combination can be dissolved in water to form a mixture, where mixed colloidal particles are formed that include water soluble resin uniformly colorant processed by a basic dye. When printing is conducted using the ink composition prepared according to the present invention, where mixed colloidal particles exist in solution, improved fixing of both the dye and the resin to the substrate is achieved. Because the mixed colloidal particles include both dye and resin, the colloidal particles are firmly fixed to the substrate by the resin component. However, because the dye is intimately mixed and associated with the resin, improved water resistance is achieved since the dye cannot be as easily liberated from the fixed resin by the presence of water.

EXAMPLES

Examples of the invention will be explained.

In the following discussion and the tables, % means percent by weight.

The water soluble colored resin of the invention is obtained as described in table 1.

TABLE 1

| | coloring resin | | | | | | |
|---|---|---|---|---|---|---|---|
| | Sample 1 | Sample 2 | Sample 3 | Sample 4 | Sample 5 | Sample 6 | Sample 7 |
| DMH | 80% | 90% | 75% | 60% | | | |
| MDMH | | | | | 60% | 80% | |
| PVP | | | | | | | 10% |
| BR1:1 | 20% | | | | | | |
| BB3 | | 10% | | | | | |
| BY40 | | | 25% | 20% | | | |
| BV1 | | | | 20% | | | |
| BV11:1 | | | | | 40% | 20% | 10% |
| PEG | | | | | | | 80% |
| total | 100% | 100% | 100% | 100% | 100% | 100% | 100% |

DMH; 5,5'-dimethylhydantoinformaldehyde resin (approximately 4000 of average molecular weight)

MDMH; 1-methylol-5,5'-dimethylhydantoin resin (approximately 2000 of average molecular weight)

PVP; polyvinylpyrolidone (approximately 9000 of average molecular weight)

BR1:1; color index number basic red 1:1
BB3; color index number basic blue 3
BY40; color index number basic yellow 40
BV1; color index number basic violet 1
BV11:1; color index number basic violet 11:1
PEG; polyethyleneglycol #200 (approximately 200 of average molecular weight)

In Samples 1-6 of coloring resin, the water soluble resin described in each Sample is melted to become liquid under a condition of the heating temperature of approximately 120° C. and the basic dye described in each Example is added thereto and mixed and stirred for one hour and after that the mixture is cooled to become a normal temperature and the solid material of coloring resin is obtained.

In Sample 7 of coloring resin, the water soluble resin described in the Sample and the basic dye described in the Sample are added to the water soluble organic solvent described in the Sample that is heated to 100° C. and stirred to be mixed for two hours and after that the mixture is cooled to become a normal temperature and the water soluble organic solvent of the coloring resin is obtained.

The molecular weight of the water soluble resin described in Table 1 is an average molecular weight, and it can be obtained by the light scattering method or the gel filtration chromatography.

Example 1

| liquid composition | |
|---|---|
| coloring resin Sample 1 | 5% |
| polyethyleneglycol (average molecular weight 200) | 10% |
| triethyleneglycolmonomethylether | 6% |
| pure (deionized) water | 79% |

After the above described materials are stirred to be mixed for enough time, the mixture is filtered with a membrane filter of 0.8 μm thickness to become ink.

By using the above-obtained ink in the following recording apparatus, the following experimental evaluation is made and good results are obtained in the recording apparatus. The recording apparatuses include: a recording apparatus having an on-demand type multi head (a diameter of jetting orifice is 35 μm, a value of a heating resistor is 150Ω, driving voltage is 30V, frequency is 2 KHz) that generates ink droplets by applying heat energy to the ink in the recording head.

(Experimental evaluation 1) jetting stability: In each of the atmosphere of the room temperature (25° C.), 5° C., and 40° C., successive jetting is made for 24 hours. Stable and high quality recording is made from the beginning to the end.

(Experimental evaluation 2) jetting response: It is evaluated for the intermittent jetting of every two seconds and jetting after two-months of non-use, no clogging is caused at the top end of the orifice in either case and stable and uniform recording is made.

(Experimental evaluation 3) quality of recorded images: An image recorded on the following recording materials has high density and clearness and its color tone is clear magenta.
recording materials:
"XEROX 4200" of XEROX
"XEROX L" of XEROX
"HAMMERMIL COPYPLUS WHITE" of non size paper
"TOYO FILTER PAPER No. 4" non size paper of TOYO ROSHI (Experimental evaluation 4) friction resistance of each recording material: After five minutes the jetting recording is made onto the recording materials described in Experimental evaluation 3, it is checked whether any image shear or blur is caused by rubbing the ink adhering part by a finger. There is no image shear or blur and the recorded image has excellent fixing.

(Experimental evaluation 5) water resistance of each recording material: After the recording materials having the characters and images recorded thereon described in Experimental evaluation 3 are soaked in tap water for thirty seconds and are taken out of the tap water and dried naturally, the degradation of the recorded characters and images is checked. There is no blur and the recorded characters can be read.

Example 2

Ink is prepared using the following liquid composition by the same method as of Example 1 and the evaluation of Experimental evaluation 1-5 is made using the recording apparatus as in Example 1. Excellent results are obtained as in Example 1. The color tone in Experimental evaluation 3 is clear magenta.

| liquid composition | |
|---|---|
| coloring resin Sample 2 | 5% |
| polyethyleneglycol (average molecular weight 200) | 10% |
| triethyleneglycolmonomethylether | 6% |
| pure (deionized) water | 79% |

Example 3

Ink is prepared using the following liquid composition by the same method as Example 1 and the evaluation of Experimental evaluation 1-5 is made using the recording apparatus as in Example 1. Excellent results are obtained as in Example 1. The color tone in Experimental evaluation 3 is clear yellow.

| liquid composition | |
|---|---|
| coloring resin Sample 3 | 5% |
| polyethyleneglycol (average molecular weight 200) | 10% |
| triethyleneglycolmonomethylether | 6% |
| pure (deionized) water | 79% |

Example 4

Ink is prepared using the following liquid composition by the same method as Example 1 and the evaluation of Experimental evaluation 1-5 is made using the recording apparatus as in Example 1. Excellent results are obtained as in Example 1. The color tone in Experimental evaluation 3 is clear black.

| liquid composition | |
|---|---|
| coloring resin Sample 4 | 5% |
| polyethyleneglycol (average molecular weight 200) | 10% |
| triethyleneglycolmonomethylether | 6% |
| pure (deionized) water | 79% |

Next, the full color recording is made by the recording apparatus described in Example 1 using the ink of Examples 1-4 as magenta ink, cyan ink, yellow ink and black ink respectively, and the recording result having clearness, high density and good color tone is obtained. The recorded images and characters do not have any bleeding or feathering and they have good printing quality.

Example 5

Ink is prepared using the following liquid composition by the same method as Example 1 and the evaluation of Experimental evaluation 1-5 is made using the recording apparatus as in Example 1. Excellent results are obtained as in Example 1.

| liquid composition | |
|---|---|
| coloring resin Sample 5 | 2% |
| glyceline | 20% |
| 2-pyrolidone | 10% |
| triethylenglycolmonobuthylether | 4% |
| pure (deionized) water | 64% |

Example 6

Ink is prepared using the following liquid composition by the same method as Example 1 and the evaluation of Experimental evaluation 1-5 is made using the recording apparatus as in Example 1. Excellent results are obtained as in Example 1.

| liquid composition | |
|---|---|
| coloring resin Sample 6 | 4% |
| glyceline | 25% |
| triethylenglycolmonobuthylether | 8% |
| pure (deionized) water | 63% |

Example 7

Ink is prepared using the following liquid composition by the same method as Example 1 and the evaluation of Experimental evaluation 1-5 is made using the recording apparatus as in Example 1. Excellent results are obtained as in Example 1.

| liquid composition | |
|---|---|
| coloring resin Sample 7 (including 16% of polyethyleneglycol) | 20% |
| color index number basic yellow 37 | 1% |
| 2-pyrolidone | 10% |
| triethylenglycolmonobuthylether | 4% |
| pure (deionized) water | 65% |

Comparative Example 1

Ink is prepared using the following liquid composition by the same method as Example 1 and Experimental evaluation 1-5 is made using the recording apparatus as in Example 1. As a result, in Experimental evaluation 3, the recording lacks clearness and has low density. In Experimental evaluation 5, terrible blur is generated and the recorded characters are hard to read.

| liquid composition | |
|---|---|
| color index number direct red 227 | 1% |
| polyethyleneglycol (average molecular weight 200) | 10% |
| triethyleneglycolmonomethylether | 6% |
| pure (deionized) water | 83% |

Comparative Example 2

Ink is prepared using the following liquid composition by the same method as Example 1 and Experimental evaluation 1-5 is made using the recording apparatus as in Example 1. As a result, in Experimental evaluation 3, the clearness of the images is not sufficient and in Experimental evaluation 5, although the recorded characters can be read, many blurs are caused.

| liquid composition | |
|---|---|
| color index number basic violet 11:1 | 1% |
| polyethyleneglycol (average molecular weight 200) | 10% |
| triethyleneglycolmonomethylether | 6% |
| pure (deionized) water | 83% |

Comparative Example 3

Ink is prepared using the following liquid composition by the same method as Example 1 and Experimental evaluation 1-5 is made using the recording apparatus as in Example 1. As a result, in Experimental evaluation 1, unstable jetting is observed partly. In Experimental evaluation 2, bent jetting or non-jetting is caused in the jetting after two-months of non-use.

| liquid composition | |
|---|---|
| coloring resin Sample 1 | 15% |
| polyethyleneglycol (average molecular weight 200) | 10% |
| triethyleneglycolmonomethylether | 6% |
| pure (deionized) water | 69% |

Next, the comparative coloring resin is obtained for comparative examples as shown in Table 2.

TABLE 2

| | Comparative coloring resin | | |
|---|---|---|---|
| | Sample 1 | Sample 2 | Sample 3 |
| DMH | 30% | 80% | |
| PVP(2) | | | 24% |
| BR1:1 | 70% | | 6% |
| DR227 | | 20% | |
| Water | | | 70% |
| Total | 100% | 100% | 100% |

DMH; 5,5'-dimethylhydantoinformaldehyde resin (approximately 4000 of average molecular weight)
PVP(2); polyvinylpyrolidone (approximately 29000 of average molecular weight)
BR1:1; color index number basic red 1:1
DR227; color index number direct red 227

In the comparative coloring resin Samples 1 and 2, the water soluble resin described in each Comparative Sample is melted to become liquid under a condition of the heating temperature of approximately 120° C. and the dye described in each Comparative Sample is added thereto and mixed and stirred for one hour and after that the mixture is cooled to become a normal temperature and a solid material of comparative coloring resin is obtained.

In the comparative coloring resin Sample 3, the water soluble resin described in the example and the basic dye described in the example are mixed in the solvent of water and stirred for one hour at a normal temperature. After that a solid material of the comparative coloring resin is obtained by the freeze drying method.

Comparative Example 4

Ink is prepared using the following liquid composition by the same method as Example 1 and Experimental evaluation 1-5 is made using the recording apparatus as in Example 1. As a result, in Experimental evaluation 5, an apparent blur is caused.

| liquid composition | |
| --- | --- |
| comparative coloring resin Sample 1 | 3% |
| polyethyleneglycol (average molecular weight 200) | 10% |
| triethyleneglycolmonomethylether | 6% |
| pure (deionized) water | 81% |

Comparative Example 5

Ink is prepared using the following liquid composition by the same method as Example 1 and Experimental evaluation 1-5 is made using the recording apparatus as in Example 1. As a result, in Experimental evaluation 3, the recording lacks clearness and has low density. In Experimental evaluation 5, terrible blur is caused and the recorded characters cannot be read.

| liquid composition | |
| --- | --- |
| comparative coloring resin Sample 2 | 5% |
| polyethyleneglycol (average molecular weight 200) | 10% |
| triethyleneglycolmonomethylether | 6% |
| pure (deionized) water | 79% |

Comparative Example 6

Ink is prepared using the following liquid composition by the same method as Example 1 and Experimental evaluation 1-5 is made using the recording apparatus as in Example 1. As a result, in Experimental evaluation 1, unstable jetting is observed frequently. In Experimental evaluation 2, bent jetting or non-jetting is caused in the jetting after two-months of non-use.

| liquid composition | |
| --- | --- |
| comparative coloring resin Sample 3 | 4% |
| triethyleneglycol | 16% |
| pure (deionized) water | 80% |

The results of Experimental Evaluation 1-5 for the above-described Examples and Comparative Examples are described in Table 3.

TABLE 3

| | Experimental Evaluation | | | | |
| --- | --- | --- | --- | --- | --- |
| | 1 | 2 | 3 | 4 | 5 |
| Example 1 | ⊚ | ⊚ | ⊚ | ⊚ | ⊚ |
| Example 2 | ⊚ | ⊚ | ⊚ | ⊚ | ⊚ |
| Example 3 | ⊚ | ⊚ | ⊚ | ⊚ | ⊚ |
| Example 4 | ⊚ | ⊚ | ⊚ | ⊚ | ⊚ |
| Example 5 | ⊚ | ⊚ | ⊚ | ⊚ | ⊚ |
| Example 6 | ⊚ | ⊚ | ⊚ | ⊚ | ⊚ |
| Example 7 | ⊚ | ⊚ | ⊚ | ⊚ | ⊚ |
| Comparative Example 1 | ○ | ○ | Δ | ○ | X |
| Comparative Example 2 | ○ | ○ | Δ | ○ | Δ |
| Comparative Example 3 | Δ | Δ | ○ | ⊚ | ⊚ |
| Comparative Example 4 | ⊚ | ⊚ | ⊚ | ⊚ | Δ |
| Comparative Example 5 | ⊚ | ⊚ | Δ | ○ | X |
| Comparative Example 6 | X | X | ⊚ | ⊚ | ⊚ |

⊚ Excellent
○ Good
Δ Not Good
X Bad

As described in Table 3, in Examples of the invention, the stable jetting, clearness of the recorded matter, high density recording, water resistance, and friction resistance are well-balanced and excellent ink jet recording is obtained. The ink of the invention is useful for ink for various types of ink jet recording and the ink jet recording method used with the ink can provide excellent recording. On the other hand, in the Comparative Examples, a problem is caused in at least one of the Experimental Evaluations.

What is claimed is:

1. A method for manufacturing a water-based ink jet ink, comprising:
   heating water-soluble resin particles to at least 60° C.;
   adding basic dye particles to the heated resin particles;
   mixing and stirring the resin particles and the basic dye particles for approximately one to two hours at a temperature of at least 60° C.;
   cooling the mixture to room temperature; and
   combining the cooled mixture with a water-soluble organic solvent;
   wherein:
   weak non-chemical bonds are formed between the resin particles and the basic dye particles; and
   the water-soluble resin particles comprise polyvinylpyrrolidone.

2. The method of claim 1, wherein the polyvinylpyrrolidone is obtained by addition polymerization of vinylpyrrolidone.

3. The method of claim 1, wherein a weight average molecular weight of a resin forming the water-soluble resin particles is 10,000 or less.

4. The method of claim 1, wherein the water-soluble resin particles and the basic dye particles are combined in weight ratio of from 10:1 to 1:1.

5. The method of claim 1, wherein, upon completion of the method, a combination of a resin forming the water-soluble resin particles and a dye forming the basic dye particles is present in the ink in an amount of from 1 to 10 weight % relative to a total weight of the ink.

6. The method of claim 1, wherein, after combining the cooled mixture with the water-soluble organic solvent, molecules of a resin forming the water-soluble resin particles and molecules of a basic dye forming the basic dye particles form a microsuspension with the water-soluble organic solvent.

7. The method of claim 1, wherein the basic dye particles comprise at least one dye selected from the group consisting of basic red 1, basic red 1:1, basic red 2, basic red 12, basic red 13, basic red 14, basic red 18, basic red 22, basic red 27, basic red 28, basic red 29, basic red 34, basic red 38, basic red 39, basic red 46, basic red 46:1, basic red 67, basic red 69, basic red 70, basic violet 1, basic violet 2, basic violet 3, basic violet 4, basic violet 5, basic violet 7, basic violet 8, basic violet 10, basic violet 11, basic violet 11:1, basic violet 20, basic violet 33, basic blue 3, basic blue 6, basic blue 7, basic blue 9, basic blue 11, basic blue 12, basic blue 16, basic blue 17, basic blue 24, basic blue 26, basic blue 41, basic blue 47, basic blue 66, basic green 1, basic green 4, basic green 5, basic yellow 1, basic yellow 11, basic yellow 19, basic yellow 21, basic yellow 24, basic yellow 25, basic yellow 28, basic yellow 29, basic yellow 36, basic yellow 45, basic yellow 51, basic yellow 67, basic yellow 73, basic orange 14, basic orange 21, basic orange 22, basic orange 32, basic brown 1, and basic brown 4.

8. The method of claim 7, wherein the basic dye particles comprise basic violet 11:1.

9. A method for manufacturing a water-based ink jet ink with improved water resistance, comprising:
first, heating a water-soluble organic solvent to at least 60° C.;
second, adding basic dye particles and water-soluble resin particles to the heated solvent, wherein the water-soluble resin particles and the basic dye particles are combined in weight ratio of from 10:1 to 1:1;
third, mixing and stirring the solvent, the dye particles and the resin particles for approximately one to two hours at a temperature of at least 60° C.; and
fourth, cooling the mixture to room temperature;
wherein:
weak non-chemical bonds are formed between the resin particles and the basic dye particles; and
the water-soluble resin particles comprise polyvinylpyrrolidone.

10. The method of claim 9, wherein the polyvinylpyrrolidone is obtained by addition polymerization of vinylpyrolidone.

11. The method of claim 9, wherein a weight average molecular weight of a resin forming the water-soluble resin particles is 10,000 or less.

12. The method of claim 9, wherein, upon completion of the method, a combination of a resin forming the water-soluble resin particles and a dye forming the basic dye particles is present in the ink in an amount of from 1 to 10 weight % relative to a total weight of the ink.

13. The method of claim 9, wherein, after cooling the mixture to room temperature, molecules of a resin forming the water-soluble resin particles and molecules of a basic dye forming the basic dye particles form a microsuspension with the water-soluble organic solvent.

14. The method of claim 9, wherein the basic dye particles comprise at least one dye selected from the group consisting of basic red 1, basic red 1:1, basic red 2, basic red 12, basic red 13, basic red 14, basic red 18, basic red 22, basic red 27, basic red 28, basic red 29, basic red 34, basic red 38, basic red 39, basic red 46, basic red 46:1, basic red 67, basic red 69, basic red 70, basic violet 1, basic violet 2, basic violet 3, basic violet 4, basic violet 5, basic violet 7, basic violet 8, basic violet 10, basic violet 11, basic violet 11:1, basic violet 20, basic violet 33, basic blue 3, basic blue 6, basic blue 7, basic blue 9, basic blue 11, basic blue 12, basic blue 16, basic blue 17, basic blue 24, basic blue 26, basic blue 41, basic blue 47, basic blue 66, basic green 1, basic green 4, basic green 5, basic yellow 1, basic yellow 11, basic yellow 19, basic yellow 21, basic yellow 24, basic yellow 25, basic yellow 28, basic yellow 29, basic yellow 36, basic yellow 45, basic yellow 51, basic yellow 67, basic yellow 73, basic orange 14, basic orange 21, basic orange 22, basic orange 32, basic brown 1, and basic brown 4.

15. The method of claim 14, wherein the basic dye particles comprise basic violet 11:1.

* * * * *